(12) United States Patent
Wu et al.

(10) Patent No.: US 10,182,111 B2
(45) Date of Patent: Jan. 15, 2019

(54) DYNAMIC ADJUSTMENT OF ENTITY ASSIGNMENT IN A MULTI-DATA CENTER ENVIRONMENT

(71) Applicant: Microsoft Technology Licensing, LLC, Redmond, WA (US)

(72) Inventors: Edward Wu, Fremont, CA (US); Yingfeng Oh, Cupertino, CA (US); Hao Liu, Sunnyvale, CA (US); Dominic Law, Sunnyvale, CA (US); Xiaokang Zhang, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 15/370,143

(22) Filed: Dec. 6, 2016

(65) Prior Publication Data

US 2018/0159927 A1 Jun. 7, 2018

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS

| 8,990,371 B2 * | 3/2015 | Kalyanaraman | H04L 67/34 709/223 |
| 9,207,964 B1 * | 12/2015 | Gwosdek | G06F 17/30743 |
| 9,690,629 B1 * | 6/2017 | Gwosdek | G06F 9/5038 |
| 2018/0150316 A1 | 5/2018 | Oh | |

* cited by examiner

*Primary Examiner* — Quang N Nguyen (74) *Attorney, Agent, or Firm* — Hickman Palermo Becker Bingham LLP; Daniel D. Ledesma (57) ABSTRACT

Techniques for handling the dynamic reassignment of entities among multiple data centers are provided. In one technique, for each task of a plurality of tasks that are associated with a first data center of a plurality of data centers, an entity identifier that is associated with the task is identified. A call to an entity routing service is initiated, where the call includes the entity A response to the call is received from the entity routing service, where the response indicates a particular data center. An entity processor that is different than the entity routing service processes the task only if the particular data center is the first data center. If the particular data center is different than the first data center, then a data structure that stores the task is updated to indicate the particular data center and the task is eventually processed in the particular data center.

15 Claims, 6 Drawing Sheets

DYNAMIC ADJUSTMENT OF ENTITY ASSIGNMENT IN A MULTI-DATA CENTER ENVIRONMENT

CROSS-REFERENCE TO RELATED APPLICATIONS

This application is related to application Ser. No. 15/362,613, filed Nov. 28, 2016; and Ser. No. 15/370,190, filed Dec. 6, 2016, the entire contents of which are hereby incorporated by reference as if fully set forth herein.

TECHNICAL FIELD

The present disclosure relates generally to data centers and, more specifically, to handling scenarios where the assignment of entities to data centers has changed.

BACKGROUND

Some companies and organizations employ data centers to address significant user demand for online content and services. A data center is a facility used to house computer systems and associated components, such as telecommunications and storage systems. A data center may include redundant or backup power supplies, redundant data communications connections, environmental controls (e.g., air conditioning, fire suppression), and various security devices. A data center may contain multiple computing devices hosting services that are client-facing (or that are used to respond directly to client requests) and services that are internal-facing (or that are used to respond to requests from components within the data center itself or from another affiliated data center).

Some companies employ multiple data centers to serve online content and services to end-users. However, different groups of data centers may operate under different paradigms. For example, in one paradigm, different data centers in a group host different content and/or services. Thus, for example, a piece of content is assigned to a first data center in a group and, while external requests for that piece of content may be handled by all data centers in the group, each data center forwards the external requests to the first data center.

In a different paradigm, multiple data centers in a group host the same content and/or services. Thus, all data centers have local access to certain data and services and, accordingly, may individually handle external requests without relying on communicating with other data centers in the group. In this way, data centers may be distributed globally, which results in lower latency for end-users of a data center.

Even in this latter paradigm, however, there may be content that only a single data center in a group should access even though multiple data centers in the group may have access. In this way, some content has a "home" data center. A reason for restricting direct access to a piece of content to a single data center may be due to the nature of the content. In some situations, a data system should not allow reads to certain content until all prior updates to the certain content have been persistently stored. A reason for copying content across multiple data centers even though the content has a home data center may be in case the home data center becomes unavailable, such as in response to an unplanned failure or in response to a planned shutdown, which may be performed for various maintenance reasons. Another data center in the group can take over as the "home" data center for that content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Entity Assignment

An "entity" is a data object that should only be accessed at a single data center and not multiple data centers. Thus, while an instance of entity may exist in multiple data centers (e.g., for failover reasons), the entity is only assigned to a data center (i.e., the "home" data center for that entity). Any requests for the entity need to be made through the home data center. A reason for restricting access to an entity through a single home data center is to prevent overwriting a later version of the entity or reading an incorrect version of the entity.

Figure 1:
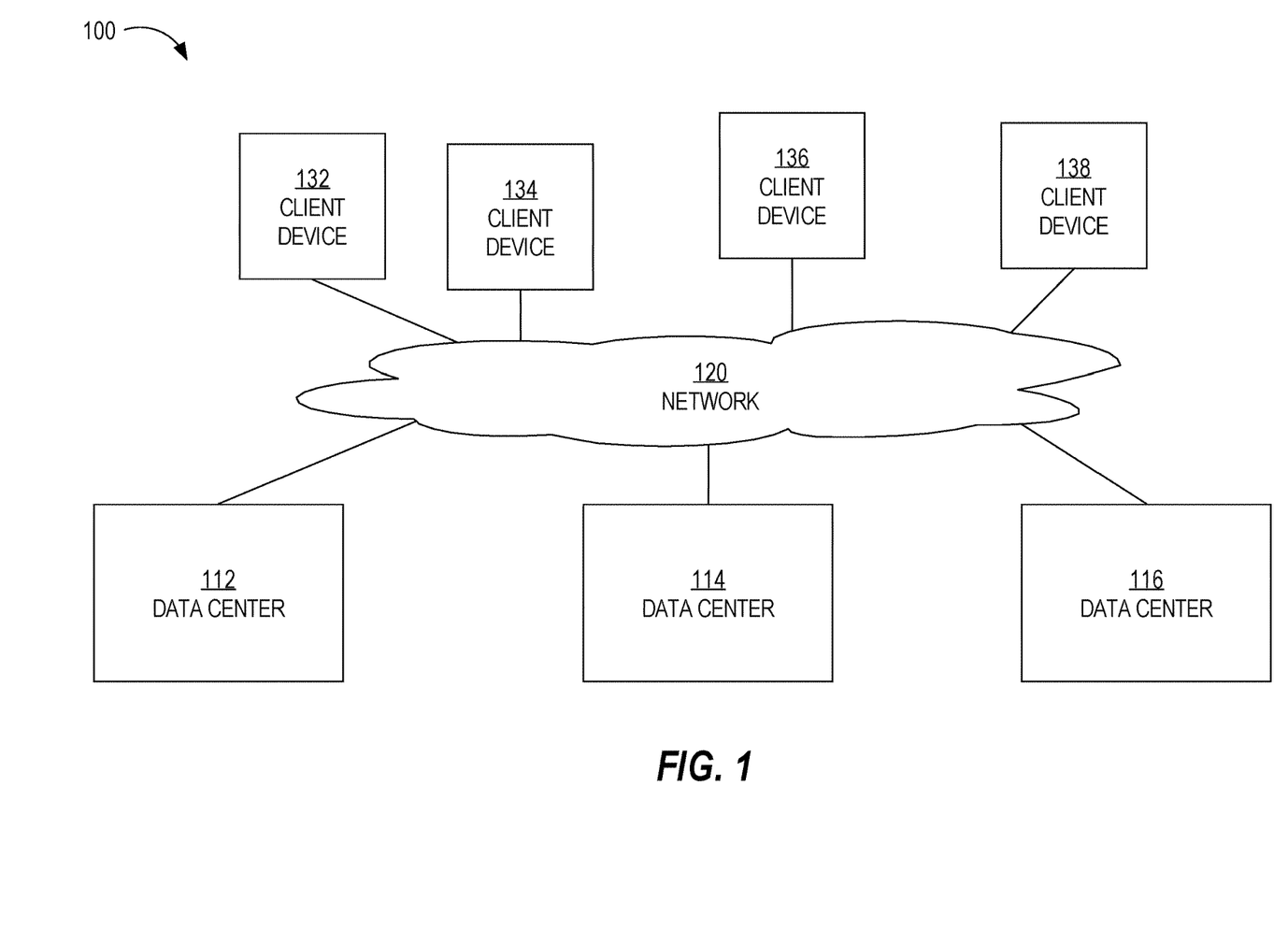
FIG. 1 is a block diagram that depicts a system comprising multiple data centers, in an embodiment.

In an embodiment, each data center stores assignment data that associates each entity, of multiple entities, with a data center. For example, assignment data stored in each data center indicates that entities A and C are assigned to data center 112 and entity B is assigned to data center 114.

Examples of an entity include an account (e.g., a recruiter account, an advertiser account, a payment account, a sales account), a contract, a content delivery campaign (e.g., an ad campaign), a creative (e.g., an advertisement), a targeting segment, a campaign insight, and a campaign recommendation. Only one or more applications may be configured to access the data object. Instances of those applications may execute in multiple data centers. If an instance of an application executes in a data center other than a home data center of an entity, then that instance forwards any requests for the entity (through one or more communication channels) to the home data center to which the entity is assigned.

In some scenarios, an entity is shared among multiple end-users; that is, multiple end-users have access to the entity. For example, an entity may be associated with each account of each user of multiple registered users of a social network service provided by a group of data centers. Only accounts that are associated with the entity are allowed (e.g., read and write) access to the entity. The entity is assigned to a particular data center within the group. All requests initiated by the registered users for the entity are routed to the particular data center. For example, a request (for an entity) received by a first data center is forwarded (based on assignment data stored in the first data center) to a second data center to which the entity is assigned. One complication in this scenario is that an entity may be assigned to a data center that is geographically distant from many users that have access to the entity. Thus, assigning the entity to the proper data center can reduce access times (or latency) for many users.

General Overview

A system and method for handling the dynamic adjustment of entity assignments in a multi-data center environment are provided. In one technique, an entity processor in a first data center retrieves a task from a queue and calls an entity routing service to determine to which data center an entity associated with the task is assigned. If the entity is assigned to the first data center, then the entity processor processes the task. Else, the queue is updated to indicate a second data center to which the entity is assigned.

In another technique, a first data center is a failover data center for a second data center that became unavailable. A queue handler in the first data center retrieves a task from a queue and calls a first process, passing an entity identifier of an entity associated with the task. The first process calls an entity routing service (passing the entity identifier) to determine to which data center the entity is assigned. With a data center indicator as a response from the entity routing service, the first process determines whether the data center indicator is on a list of data center indicators. If so, then the queue handler processes the task or passes the task to an entity processor to process the task.

System Overview

FIG. 1 is a block diagram that depicts a system 100 comprising multiple data centers, in an embodiment. System 100 comprises data centers 110-116, network 120, and client devices 132-138. Although three data centers are depicted, system 100 may include any number of two or more data centers. Also, although only four client devices are depicted, system 100 may include any number of two or more client devices, each having access to a particular entity.

Network 120 may be implemented on any medium or mechanism that provides for the exchange of data between client devices 132-138 and data centers 110-116. Network 120 may comprise multiple networks, such as one or more Local Area Networks (LANs), one or more Wide Area Networks (WANs), Ethernet or the Internet, and/or one or more terrestrial, satellite or wireless links. In an embodiment, data centers 110-116 are connected to each other using one or more dedicated lines or links instead of over multiple networks or the Internet. Such dedicated lines allow for the relatively fast transmission of data between data centers 110-116.

Each client device 132-138 is a computing device. Examples of computing devices include a laptop computer, a tablet computer, a smartphone, a desktop computer, and a personal digital assistant (PDA), and a wearable device. Each client device executes an application. An example of an application includes a dedicated application that is installed and executed on a local computing device and that is configured to communicate with one of data centers 110-116 over network 120. Another example of an application is a web application that is downloaded (e.g., from one of data centers 110-116) and that executes within a web browser running on a client device.

Data Centers

Although depicted as a single element, each of data centers 110-116 may comprise multiple computing elements and devices, connected in a local network or distributed regionally across multiple networks, such as the Internet. A computing device within a data center may host multiple applications and multiple computing devices within a data center may host different instances of the same set of applications.

For example, each data center may include an account database that contains information about multiples accounts. Some accounts may be associated with a single registered user while other accounts may be associated with multiple registered users. An account database may be stored on one or more storage devices (persistent and/or volatile) that may reside within the same local network as the corresponding data center.

In a social networking context, data centers 110-116 are provided by a social network provider, such as LinkedIn, Facebook, or Google+. In this context, each user account in an account database includes a user profile, each provided by a different user. A user's profile may include a first name, a last name, a digital image of the user, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include applying to certain jobs, views of job postings, views of company pages, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, or colleague of the user.

Services executing within a data center may prompt users to provide profile information in one of a number of ways. For example, a service may have provided a web page with a text field for one or more of the above-referenced types of information. In response to receiving profile information from a user's device, one or more of data centers 110-116 stores the information in an account that is associated with the user and that is associated with credential data that is used to authenticate the user to one of data centers 110-116 when the user attempts to log into his/her account at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

While some examples herein are in the context of social networking, embodiments are not so limited. The type of data stored in each data center and the type of services provided by each data center are tangential to how entities are determined to be assigned to which data centers.

Data Center Components

Figure 2:
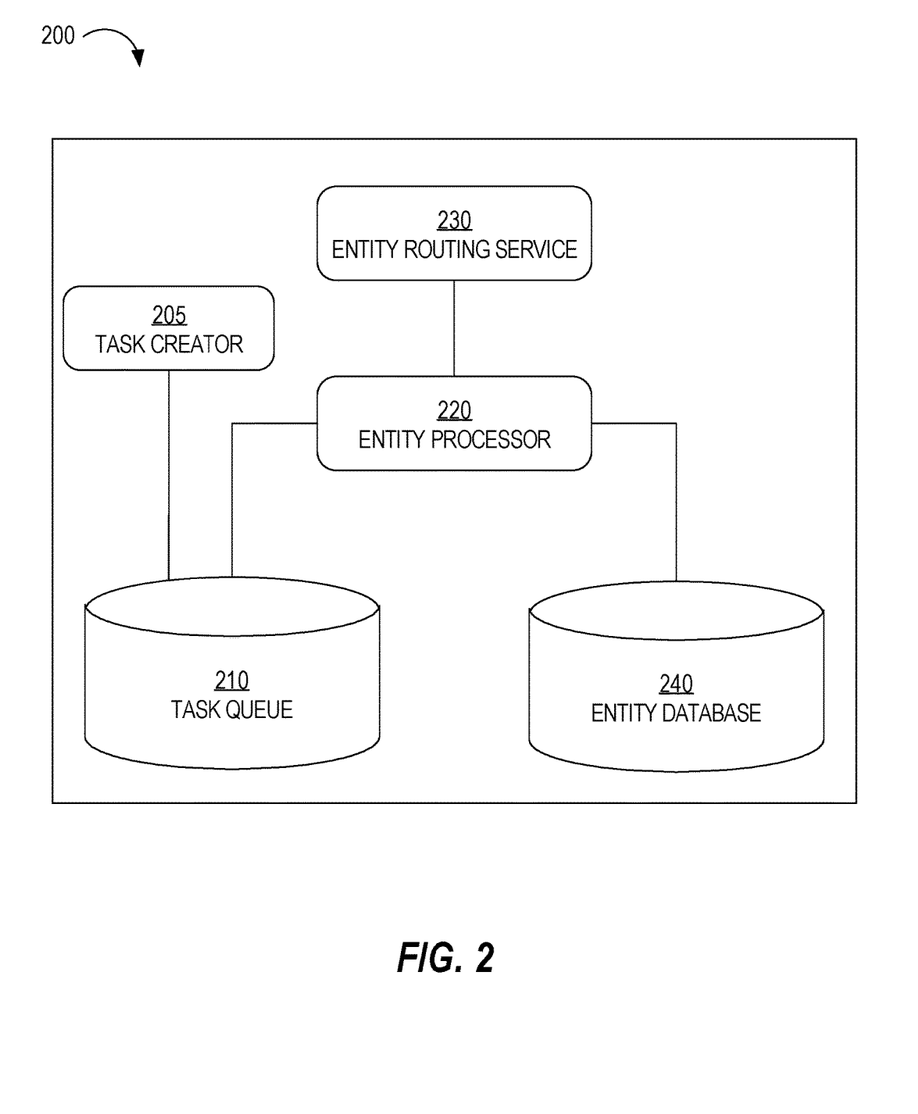
FIG. 2 is a block diagram of various components of a data center that are related to entity assignment, in an embodiment.

FIG. 2 is a block diagram of various components of a data center 200 that are related to entity assignment, in an embodiment. Data center 200 may be any one of data centers 112-116. Data center 200 includes a task creator 205, a task queue 210, an entity processor 220, an entity routing service 230, and an entity database 240.

Entity database 240 may be implemented on one or more storage media. Examples of entity database 240 include a relational database, an object-relational database, and a No SQL database. Entity database 240 includes information about multiple entities, each of which is assigned to a particular data center. An instance of entity database 240 is maintained in each data center in a group of data centers in case any one data center in the group fails or becomes otherwise unavailable. Thus, changes that are made to entity database 240 are applied to each corresponding entity database in the other data centers. For example, an entity may be a content delivery campaign and potential changes to the content delivery campaign include an update to a budget of the content delivery campaign, a deactivation of the content delivery campaign, or a resuming of a paused content delivery campaign.

Each change to an entity is first applied to the entity's home data center (or, more specifically, to the entity's home entity database) and then applied (or replicated) to each other entity database in the other data centers. Thus, while at any one point (or snapshot) in time none of the data centers entity databases exactly match each other, any changes that have been applied to a "home" entity database are persistently stored and will be used to update each other entity database.

Embodiments are not limited to any particular technique for replicating changes to multiple data centers. One example technique is implemented by Oracle's GoldenGate. The particular technique may be implemented in a database layer that is separate from the processing layer (where one or more entity processors process tasks) that is described herein.

While FIG. 2 only depicts a single entity database 240, data center 200 may include multiple entity databases. Each entity database may contain data about different types of entities. For example, one entity database includes data about creatives, another entity database includes data about content delivery campaigns (each of which may include multiple creatives), and another entity database includes data about accounts (each of which may include multiple content delivery campaigns).

Task queue 210 is a data structure that includes an entry for each task that is to be processed by entity processor 220 or by an entity processor in another data center. Example data structures include a table, an array, and a linked list. Task queue 210 is mirrored across each data center in a data center system. Any changes (e.g., insertions, deletions, updates) to one tasks queue are replicated to task queues in the other associated data centers.

Task queue 210 may contain tasks for entities that are assigned to different data centers. For example, a first task in task queue 210 may correspond to a first entity that is assigned to data center 112 and a second task in task queue 210 may correspond to a second entity that is assigned to data center 114. Alternatively, data center 200 includes a different task queue for each data center. For example, one task queue includes tasks only associated with data center 112 and another task queue includes tasks only associated with data center 114. Thus, all data centers in the data center system would include the same number of queues.

Each task, when processed by entity processor 220, causes one or more changes to be applied to the corresponding entity in entity database 240. A task is a unit of work that can be completed by entity processor 220. Tasks are created by task creator 205. Although only one task creator is depicted, data center 200 may include multiple task creators that can create tasks and cause the tasks to be inserted into task queue 210. A task creator 205 may be a server application that responds to client requests, a service that such an application calls, or any other type of software program.

A task includes an entity identifier that identifies a particular entity, a data center indicator that indicates or identifies a particular data center, an access type (e.g., read, write, delete, insert, and update), and one or more parameters that identify or otherwise indicate which field, column, attribute, or data item of an entity is to be accessed. For example, if an entity is a campaign, a parameter may be a status of the campaign, such as active, not-yet-started, paused, exhausted, or deactivated. Other example parameters of a campaign type of entity include starting criteria (e.g., a start date), ending criteria (e.g., 2,000 impressions), a budget, a manager, one or more targeting criteria (indicating one or more attributes that a user/device must/may have in order to receive a creative associated with the campaign), and one or more contextual criteria (indicating one or more attributes of content that is currently being displayed to a user that might receive a creative associated with the campaign).

Entity Processor

Entity processor 220 is implemented in software, hardware, or any combination thereof. Entity processor 220 retrieves one or more tasks from task queue 210. For example, entity processor 220 retrieves the task at the head of task queue 210, determines whether the task identifies or is otherwise associated with data center 200, processes the task (which may involve reading data from a data source, such as entity database 240) if the task is associated with data center 200, generates change data based on processing the task, and causes the change data to be stored (e.g., in the same or different data source from which data was read while processing the task).

As another example, entity processor 220 selects, from task queue 210, multiple tasks that are associated with data center 220. Such a selection may involve sending, to task queue 210 (or to a process associated with task queue 210), a request (e.g., a SQL query) that indicates data center 200 (e.g., a data center identifier that identifies data center 200). In response, entity processor 220 receives, from task queue 210, tasks that are associated with data center 200.

In a related embodiment, another component or process retrieves tasks from task queue 210 on behalf of entity processor 220 and sends the tasks (e.g., one at a time) to entity processor 220. Such a component or process is referred to herein as a "queue handler." In this way, entity processor 220 does not have to interact directly with task queue 210.

In an embodiment, entity processor 220 selects a set of one or more tasks periodically, such as every two minutes. Thus, entity processor 220 may "wake up" or be activated by a scheduler process and process a batch of tasks at, for example, different times in a day or different days in a week. During time periods in which entity processor 220 is inactive, an entity may be reassigned to different data centers multiple times. Therefore, while a task is in task queue 210, the entity associated with the task may be assigned to three or more data centers (i.e., at different times).

Although only one entity processor 220 is depicted, data center 220 may include multiple entity processors. For example, different entity processors may be responsible for processing different types of tasks, each type of task corresponding to a different type of entity. For example, one entity processor processes tasks related to creatives, another entity processor processes tasks related to content delivery campaigns (each of which may include multiple creatives), and another entity processor processes tasks related to accounts (each of which may include multiple content delivery campaigns).

In the embodiment where there are multiple entity processors and a queue handler, the queue hander retrieves multiple tasks from task queue 210 and distributes the tasks to the different entity processors. The distribution may be based on one or more factors, such as type of task or entity, timestamp associated with a task, and/or load of the entity processors. For example, the queue handler retrieves a task from task queue 210, determines a type of entity associated with the task, and sends the task to the entity processor that is associated with the same type of entity. As another example, the queue handler retrieves tasks from task queue 210 and sends the tasks to the entity processors in a round-robin fashion. As another example, the queue handler retrieves tasks from task queue 210, determines which entity processors are least loaded (e.g., have the fewest pending tasks in their respective "mini-queues") and sends the tasks to the least-loaded entity processor(s).

Entity Routing Service

Entity routing service 230 is a service that a process calls (e.g., from entity processor 220 or a queue handler as described herein) before processing a task from task queue 210. Entity routing service 230 receives, as part of call, an entity identifier and returns, in response to the call, an indication of a data center to which the corresponding entity is assigned. Entity processor 220 processes the task associated with the corresponding entity if the indicated data center is the same data center in which the caller resides. Otherwise, entity processor 220 (or a queue handler) updates an entry, in task queue 210, that corresponds to the task, by indicating the determined data center. Such an updated entry may be automatically propagated or replicated to task queues in other data centers so that the proper data center eventually processes that task.

Entity routing service 230 has access to storage that stores a mapping that maps entity identifiers to data center indicators or identifiers. In response to receiving a (e.g., API) call that includes an entity identifier, entity routing service 230 uses the entity identifier and the mapping to look up the corresponding data center indicator. Example implementations of the mapping include a table, a hash table, an index, and an array.

Different portions of the mapping may be updated periodically or at other non-regular times. Entity routing service 230 may also receive another type of (e.g., API) call that includes an entity identifier and a data center indicator and causes entity routing service 230 to update an entry, in the mapping, that corresponds to the entity. The update involves replacing the current data center indicator with the data center indicator included in the call.

Other services or applications may execute in data center 200 or other data centers in order to adjust or change entity assignment. One reason for a reassignment may be due to the relative load of one data center to other data centers. For example, data center 112 may be heavily loaded, at least compared to data centers 114 and 116, which heavy load may be increasing the latency of some client requests to data center 112. To alleviate the increased latency, one or more entities that are assigned to data center 112 are assigned to data center 114 and/or data center 116. Another reason for a reassignment may be due to where most client requests are originating for a particular entity. For example, if multiple client devices are assigned to a particular entity that is assigned to data center 112 and most of the online traffic related to the particular entity originates from client devices closest to data center 116, then the particular entity may be assigned to data center 116.

Example Process

Figure 3:
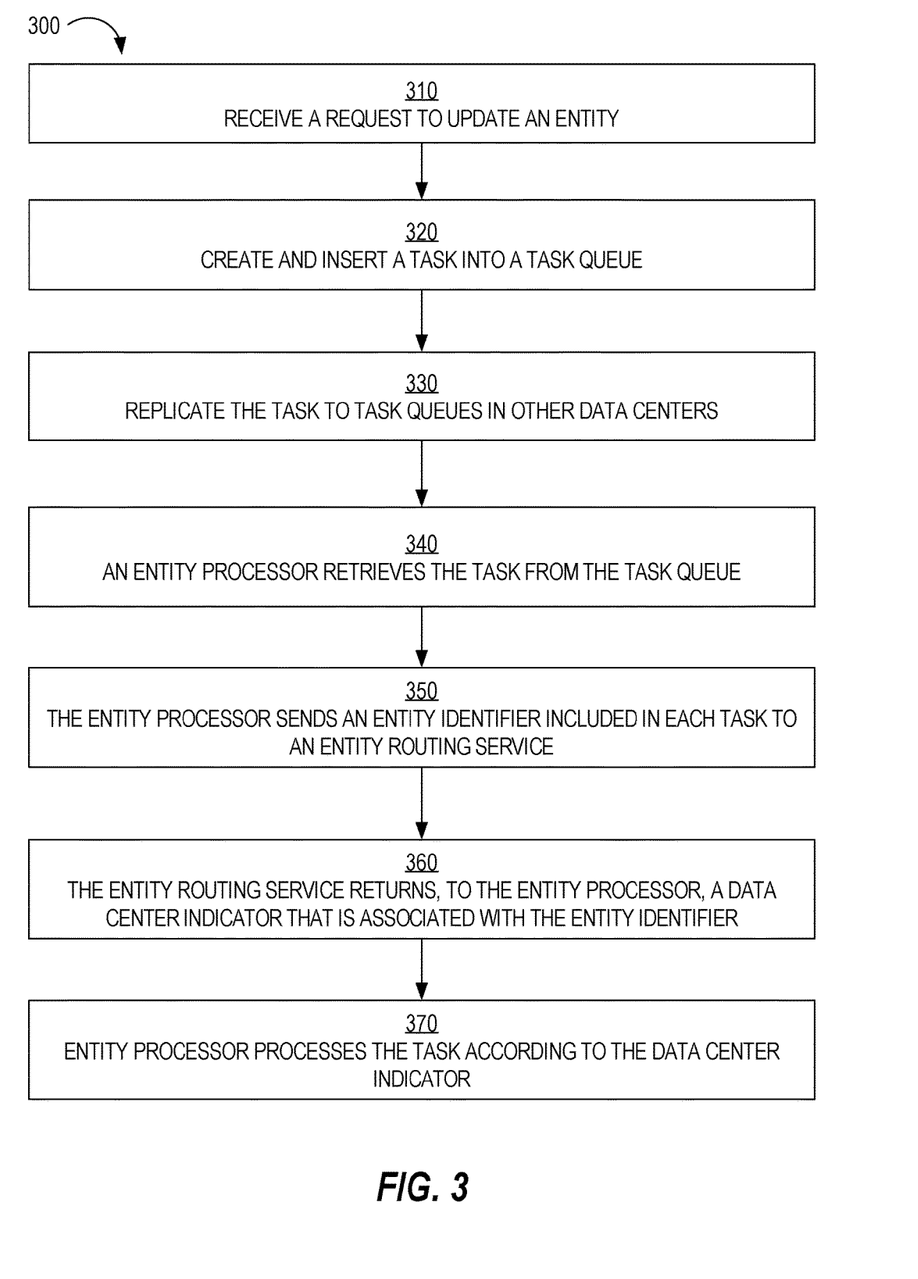
FIG. 3 is a flow diagram that depicts a process for processing a task associated with an entity, in an embodiment.

FIG. 3 is a flow diagram that depicts a process for processing a task associated with an entity, in an embodiment. Process 300 will be described in the context of system 100 and data center 200.

At block 310, a request to update an entity is received. Block 310 may involve a client device (e.g., client device 132) sending a request to a data center (e.g., data center 112). The request involves updating or changing an entity to which the client device has access. For example, the update may be a modification of a budget associated with a particular campaign (i.e., the entity). As another example, the update may be pausing all campaigns associated with a particular account. The request that causes the update may originate from a client request (i.e., outside of the data center system) or from internal processing within the data center system.

At block 320, a task is created and placed in task queue 210. Task creator 205 (e.g., a server-side application) that receives the request may create the task and cause task queue 210 to include the task. Alternatively, another service or process may instruct task creator 205 to create the task, which in turn updates task queue 210.

If there are multiple task queues, then block 320 involves selecting the proper task queue for insertion of a task. For example, if there is a different task queue for each type of entity, then task creator 205 determines the type of entity that is involved in the task and selects the task queue that is associated with that type of entity. Alternatively, task creator 205 may be "hard-coded" to know which task queue is to be updated with a task. For example, if a server-side application is related to updating accounts, then the server-side application, when creating a task, automatically causes a task to be inserted into a task queue associated with accounts, i.e., without having to select the task queue from among multiple task queues.

At block 330, the task is replicated to other task queues in other data centers. For example, if the task is created in data center 112, then the task is replicated to data centers 114-116.

Block 330 may be implemented by a storage layer that is separate from the processes that create the tasks and the entity processors that process the tasks. In this way, all data centers store all tasks, even though any one task queue in a data center may store tasks of entities that are assigned to other data centers. This propagation of a task allows an entity processor in a second data center to process a task of an entity that was assigned to a first data center but that has been reassigned to the second data center sometime after (or right before) the request that triggered the task was received but before the entity processor processes the task. This propagation of a task also allows a data center to take over for another data center that becomes unavailable. For example, if data center 112 goes down and all entities that were assigned to data center 112 are assigned to data center 114, then entity processor(s) in data center 114 will process tasks associated with those entities.

At block 340, entity processor 220 retrieves the task from task queue 210. Block 340 may involve retrieving, from task queue 210, multiple tasks associated with entities assigned to data center 220. As noted above, block 340 may involve sending, to a process associated with task queue 200, a SQL query that includes a data center indicator that identifies or otherwise indicates data center 200.

At block 350, entity processor 220 sends an entity identifier included in each task to entity routing service 230. Block 350 may involve entity processor 220 sending, to entity routing service 230, an API call that includes one or more entity identifiers. If multiple entity identifiers are included in the call, then the entity identifiers may be in an array, vector, or other data structure that can be passed as a parameter of the call.

At block 360, entity routing service 230 returns, to entity processor 220, a data center indicator for each received entity identifier. For example, if an API call includes a single entity identifier, then entity routing service 230 identifies and returns a single data center indicator (that is associated with the entity identifier). If an API call includes multiple entity identifiers, then entity routing service 230 returns multiple data centers indicators. The multiple data center indicators may have the same order as the multiple entity identifiers. In this way, entity processor 220 may quickly determine which tasks are associated with data center 200.

At block 370, entity processor 220 processes each task that is associated with data center 200. Thus, tasks associated with other data centers are ignored and not processed by entity processor 220. Block 370 may involve entity processor 220 reading data from, and storing data to, entity database 240. In an embodiment, changes that are made to entity database 240 are automatically replicated to other data centers.

Block 370 may also involve entity processor 220 updating task queue 210 to indicate that the task has been processed and, if the task has not been processed due to the corresponding entity being assigned to a different data center, updating task queue 210 to associate the task with that different data center. Such updates may also be automatically replicated to task queues in other data centers.

Queue Handler Embodiment

Figure 4:
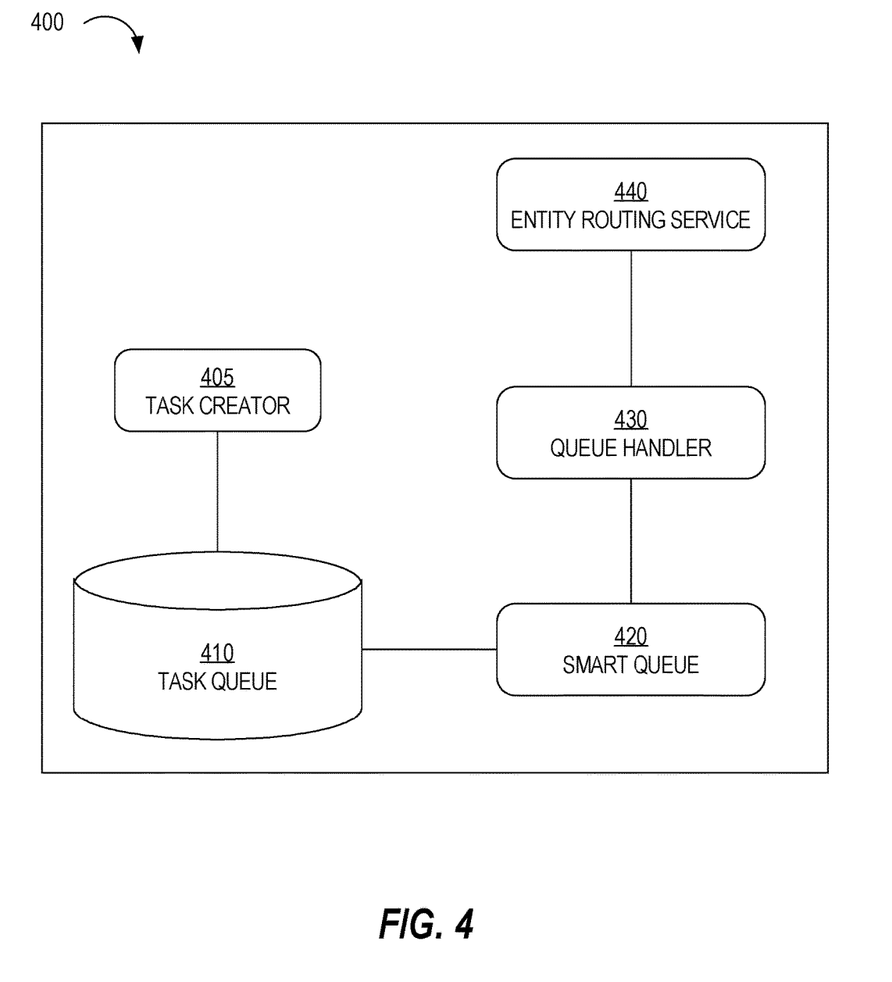
FIG. 4 is a block diagram that depicts a data center, in an embodiment.

FIG. 4 is a block diagram that depicts a data center 400, in an embodiment. Data center 400 is similar to data center 200 in some respects. Data center includes a task creator 405, a task queue 410, a smart queue 420, a queue handler 430, and an entity routing service 440. Task creator 405 is similar to task creator 205, task queue 410 is similar to task queue 420, and entity routing service 440 is similar to entity routing service 230. Data center 400 also includes (although not shown) one or more entity processors similar to entity processor 220 and an entity database that is similar to entity database 240.

Smart queue 420 is similar in some respects to entity processor 220 in that smart queue 420 retrieves tasks from task queue 410 based on which data center the tasks are associated. For example, if a task in task queue 410 is associated with data center 400, then smart queue 420 inserts the task in smart queue 420's own queue.

Queue handler 430 retrieves tasks from smart queue 420. Queue handler 430 "listens" to smart queue 420; or rather, queue handler 430 registers with smart queue 420, which will then forward tasks to queue handler 430. Smart queue 420 may forward tasks one task at a time or in batches. For example, smart queue 420 sends however many tasks are in its queue every five seconds.

Queue handler 430 is similar to entity processor 220 in that queue handler 430 calls entity routing service 440 to determine to which data center one or more tasks are assigned. The call may include a single entity identifier or multiple entity identifiers. If a task is associated with an entity that is assigned to data enter 400, then queue handler 430 sends the task to an entity processor for processing. If there are multiple entity processors, then queue handler 430 determines which of the entity processors will process the task (as described previously). If a task is associated with an entity that is not assigned to data enter 400, then queue handler 430 updates task queue 410 to indicate the different data center for that task. The update is then replicated to task queues in other data centers.

Data Center Failover

In some situations, a data center goes down or becomes otherwise unavailable. Such a data center is referred to herein as an "unavailable data center." Other data centers are referred to as "available data centers." A data center may be shut down based on user input as part of a planned shutdown. Alternatively, a data center may automatically detect that another data center is not responding to heartbeat messages that are regularly transferred between the data centers, where the heartbeat messages indicating (e.g., by their very existence or with data within the messages) their respective "health" or ability to operate normally.

In a failover scenario, operations that were performed by an unavailable data center are subsequently performed by another data center, referred to herein as a "failover data center." Thus, any entities that were assigned to the unavailable data center are reassigned to the failover data center after the unavailable data center is determined to be unavailable (or prior to the unavailable data center becoming unavailable in case of a planned shutdown scenario).

In an embodiment, one or more entity routing services in one or more available data centers are notified that a particular data center is (or is about to become) an unavailable data center and, optionally, that another data center is a failover data center. In the case of a two-data center system, the failover data center is the only available data center, in which case, the failover data center only determines that the unavailable data center is unavailable and the failover data center can operate without being separately notified of which data center is the failover data center.

In the case of a data center system that includes more than two data centers, each entity routing service in an available but non-failover data center does not need to be notified of the identity of the failover data center because entities that were assigned to the unavailable data center are still assigned to a data center that is different than the available but non-failover data center. For example, data center 116 becomes unavailable and data center 114 becomes the failover data center. In this example, data center 112 is an available but non-failover data center. An entity routing service in data center 112 does not need to be informed of data center 114 becoming the failover data center for data center 116. Any entity processors in data center 112 will still ignore or not process any tasks associated with entities assigned to data centers 114 or 116.

In response to being notified of an unavailable data center, an entity routing service (of at least a failover data center) stores data that indicates that the current data center is a failover data center. (Depending on implementation details, an available but non-failover data center may also be notified of which data center is the failover data center.) The data that is stored may be a data center indicator that indicates or identifies the unavailable data center. Such data is stored with data that indicates that the failover data center is the failover data center. Alternatively, the entity routing service updates a mapping (i.e., of entity identifiers to data center indicators) to replace data center indicators of the unavailable data center with data center indicators of the failover data center. However, such an approach may be unnecessary if the following process is implemented.

In an embodiment, a user (e.g., a data center administrator) provides, to a failover data center, input that indicates the unavailable data center. Input may be provided in any number of ways, including using Java Management Extensions (JMX), which is a Java technology that supplies tools for managing and monitoring applications, system objects, devices, and service-oriented networks. Resources are represented by objects called MBeans (for Managed Bean). In the API for JMX, classes can be dynamically loaded and instantiated. The input specifying a data center indicator is stored in (e.g., volatile) memory that is accessible to (a) an entity routing service of the failover data center or (b) a process that is associated with the entity routing service. In this way, the failover data center "knows" that it is a failover data center for that unavailable data center and that the failover data center needs to process tasks associated with entities that are/were assigned to the unavailable data center.

Example Failover Process

Figure 5:
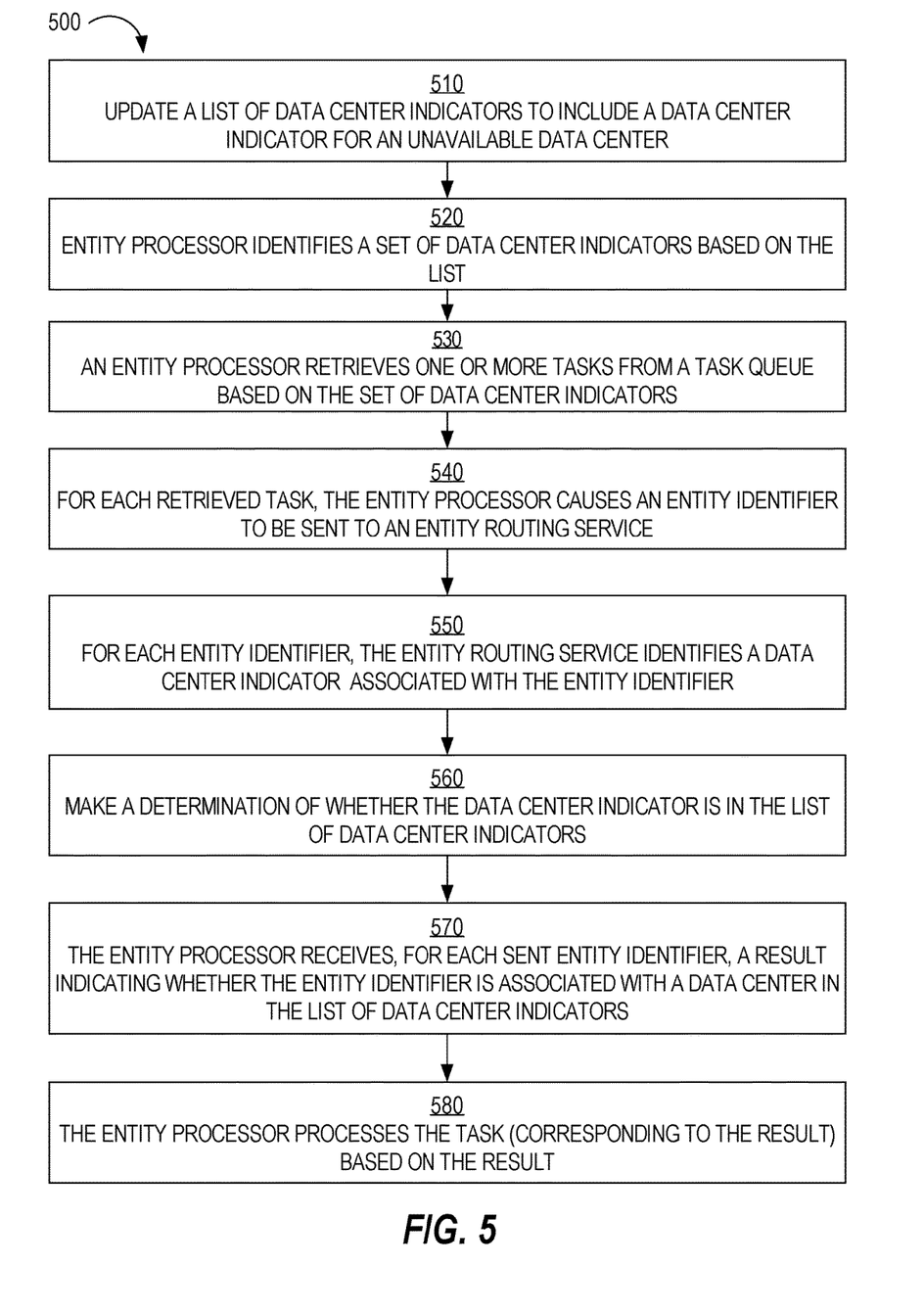
FIG. 5 is flow diagram that depicts a process for processing tasks when a data center becomes unavailable, in an embodiment.

FIG. 5 is flow diagram that depicts a process 500 for processing tasks when a data center becomes unavailable, in an embodiment. Process 500 is described in the context of data center 200, which is acting as a failover data center.

At block 510, in data center 200, a list of data center indicators is updated to include an indicator for an unavailable data center. The list of data center indicators may be updated based on user input or automatically based on determining that the unavailable data center is unavailable.

At block 520, entity processor 220 identifies a set of data center indicators. Each data center indicator indicates a data center for which data center 200 is responsible. Thus, the set of data center indicators includes one that indicates data center 200. In this example, the set of data center indicators also includes one that indicates an unavailable data center that is different than data center 200.

Block 520 may involve entity process 230 sending a request (e.g., via an API call) to entity routing service 230 (or another process associated with entity routing service 230). The request is for one or more data center indicators. The result of the request may only include data center indicators for unavailable data centers since it may be presumed that data center 200 is responsible for processing tasks of entities assigned to data center 200. Thus, the set of data center indicators that entity process 230 identifies in block 520 may always include a data center indicator for data center 200.

At block 530, entity processor 220 retrieves one or more tasks from task queue 210 using the set of data center indicators. For example, entity processor 220 sends, to a database server associated with task queue 210, a SQL query that includes the set of data center indicators as a predicate. In response, entity processor 220 receives all tasks that associated with one of the data center indicators in the set. For example, the tasks include (1) tasks associated with entities assigned to data center 200 and (2) tasks associated with entities assigned to any unavailable data center.

At block 540, for each task retrieved by entity processor 220, entity processor 220 calls entity routing service 230 by sending at least an entity identifier indicated in the task. Alternatively, the call may be to another process that passes the entity identifier(s) to entity routing service 230. An example of the other process is a wrapper function (or simply "wrapper") on entity routing service 230. A wrapper is a subroutine in a software library or a computer program whose main purpose is to call a second subroutine or a system call with little or no additional computation.

At block 550, for each entity identifier, entity routing service 230 identifies a data center indicator associated with the entity identifier.

At block 560, a determination is made regarding whether the data center indicator is in the list of data center indicators. Block 560 may be performed by entity routing service 230 or the other process (e.g., a wrapper on entity routing service 230).

At block 570, entity processor 220 receives (e.g., from entity routing service 230 or the wrapper), a result for each entity identifier sent to entity routing service 230.

At block 580, entity processor 220 processes, based on the result, the task corresponding to the result. If the result is that entity processor 220 should process the task, then entity processor 220 does so. If the result is that entity processor 220 should not process the task, then the result may include a data center indicator of another data center to which the corresponding entity is assigned, which is not data center 200 and not any unavailable data center for which data center 200 is responsible. For each result, entity processor 220 updates task queue 210 to indicate (a) whether the task has been completed or (b) with which data center the task is associated.

Failover in a Queue Handler Context

Process 500 involves entity processor 220 performing many of blocks 520-580. In a related embodiment, one or more other components of a data center performs those steps. For example, in the context of data center 400, smart queue 420 communicates with a processor associate with entity routing service 440 (e.g., a wrapper on entity routing service 440) to identify data centers for which data center 400 is responsible and uses the retrieved list of data center indicators to retrieve tasks from task queue 410. In this way, smart queue 420 retrieves, from task queue 410, tasks that are associated with data center 400 and one or more unavailable data centers.

For each task in a queue of smart queue 420, queue handler 430 calls (by sending an entity identifier indicated in the task) the wrapper on entity routing service 440 to determine whether queue handler 430 should assign the task to an entity processor in data center 400 (not shown).

The wrapper on entity routing service 440 retrieves, from entity routing service 440 and based on the entity identifier, a data center indicator and then compares the data center indicator to a list of data center indicators. The wrapper informs queue handler 430 about the result of each entity identifier lookup. If the data center indicator is in the list, then queue handler 430 processes the task or sends the task to an entity processor. Otherwise, queue handler 430 updates the task queue to indicate that the task is associated with a different data center (e.g., by including a data center indicator returned by entity routing service 440 through the wrapper).

Embodiments described herein regarding data center failover may be employed in the non-failover context. In other words, techniques regarding how to handle a failover scenario may also be used to handle a dynamic adjustment of an entity's assignment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
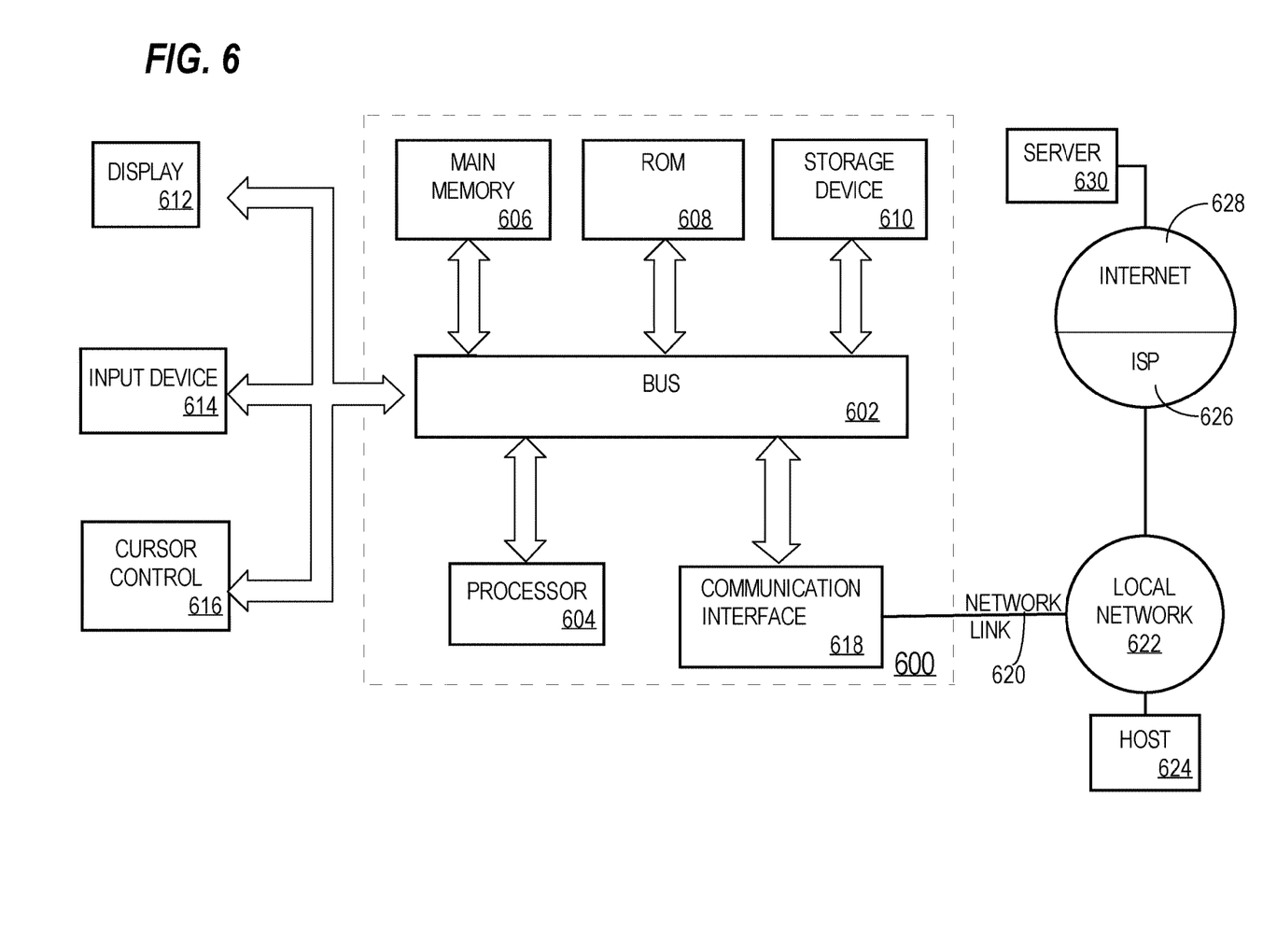
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by one or more processors, cause:
   for each task of a plurality of tasks that are associated with a first data center of a plurality of data centers:
      identifying an entity identifier that is associated with said each task;
      initiating a call to an entity routing service, wherein the call includes the entity identifier;
      receiving, from the entity routing service, a response that indicates a particular data center;
      processing, by an entity processor that is different than the entity routing service, said each task only if the particular data center is the first data center;

wherein the particular data center is the first data center, wherein the instructions, when executed by the one or more processors, further cause:
   retrieving the plurality of tasks from a queue that is replicated across the plurality of data centers;
   wherein the queue contains one or more tasks that are associated with a second data center, of the plurality of data centers, that is different than the first data center;
   wherein prior to inserting a particular task to the queue, the particular task is associated with a particular entity identifier that is associated with the first data center;
   after the particular task is inserted into the queue and prior to initiating, based on the particular entity identifier, a particular call to the entity routing service, updating a mapping accessible to the entity routing service to indicate that the particular entity identifier is associated with a third data center that is different than the first data center.

2. The system of claim 1, wherein the instructions, when executed by the one or more processors, further cause:
   for each task that is processed by the entity processor, causing an update to be applied to the queue to indicate that said each task has been processed, wherein the update is replicated to the plurality of data centers.

3. The system of claim 1, wherein the instructions, when executed by the one or more processors, further cause:
   initiating the particular call to the entity routing service, wherein the particular call includes the particular entity identifier;
   determining, by the entity routing service, that the particular entity identifier is associated with the third data center;
   receiving, from the entity routing service, a particular response that indicates that the particular entity identifier is associated with a data center that is different than the first data center;
   determining, based on the particular response, not to process the particular task.

4. The system of claim 3, wherein the instructions, when executed by the one or more processors, further cause:
   in response to determining not to process the particular task, causing an update to be applied to the queue, in the first data center, from which the plurality of tasks are retrieved;
   wherein the update indicates that the particular task is associated with the second data center;
   wherein updates to the queue are automatically replicated to other data centers in the plurality of data centers.

5. The system of claim 1, wherein the particular data center is the first data center, wherein processing said each task comprises:
   based on the entity identifier of said each task, identifying a particular row in a table that is replicated across the plurality of data centers;
   applying one or more changes to the particular row based on said task;
   wherein, after the one or more changes are applied to the particular row, the one or more changes are replicated to each other data center, of the plurality of data centers, that is different than the first data center.

6. The system of claim 1, wherein identifying the entity identifier, initiating the call, and receiving the response are performed by a queue handler, wherein processing said each task is performed by one or more entity processors.

7. The system of claim 6, wherein the instructions, when executed by the one or more processors, further cause:
  determining, by the queue handler, based on a particular response from the entity routing service, that a second particular entity identifier of a second particular task is associated with the first data center;
  in response to determining that the second particular entity identifier is associated with the first data center, selecting a particular entity processor from among a plurality of entity processors that execute in the first data center;
  processing, by the particular entity processor, the second particular task.

8. A system comprising:
  one or more processors;
  one or more storage media storing instructions which, when executed by one or more processors, cause:
    updating data center assignment data to indicate that a first data center, of a plurality of data centers, is to process tasks that are related to entities that were assigned to a second data center, of the plurality of data centers, that is different than the first data center;
    based on the data center assignment data, retrieving a plurality of tasks that are related to entities that are assigned to the first data center or the second data center;
    for each task of the plurality of tasks:
    identifying an entity identifier that is associated with said each task;
    initiating a call that is associated with an entity routing service, wherein the call includes the entity identifier;
    receiving, based on the call, a response that indicates a particular data center;
    processing said each task only if the particular data center is the first data center or the second data center;
  wherein:
    initiating and receiving are performed by a first process;
    initiating the call comprises initiating a third call to a second process that is different than the first process and that receives the entity identifier;
    the instructions which, when executed by the one or more processors, further cause, prior to the first process receiving the response:
      initiating, by the second process, a second call to the entity routing service, wherein the second call includes the entity identifier;
      receiving, by the second process, from the entity routing service, a first response that indicates the particular data center;
      determining, by the second process, whether the particular data center is indicated in a list of data center indicators.

9. The system of claim 8, wherein the instructions, when executed by the one or more processors, further cause, prior to receiving the response:
  making a determination, based on the data center assignment data, whether the particular data center is indicated in the list of data center indicators;
  wherein the response is based on the determination.

10. The system of claim 9, wherein the second process is a wrapper function on the entity routing service.

11. A method comprising:
  for each task of a plurality of tasks that are associated with a first data center of a plurality of data centers:
    identifying an entity identifier that is associated with said each task;
    initiating a call to an entity routing service, wherein the call includes the entity identifier;
    receiving, from the entity routing service, a response that indicates a particular data center;
    processing, by an entity processor that is different than the entity routing service, said each task only if the particular data center is the first data center;
  wherein the method is performed by one or more computing devices;
  wherein the particular data center is the first data center, the method further comprising:
    retrieving the plurality of tasks from a queue that is replicated across the plurality of data centers;
    wherein the queue contains one or more tasks that are associated with a second data center, of the plurality of data centers, that is different than the first data center;
    wherein prior to inserting a particular task to the queue, the particular task is associated with a particular entity identifier that is associated with the first data center;
    after the particular task is inserted into the queue and prior to initiating, based on the particular entity identifier, a particular call to the entity routing service, updating a mapping accessible to the entity routing service to indicate that the particular entity identifier is associated with a third data center that is different than the first data center.

12. The method of claim 11, further comprising:
  for each task that is processed by the entity processor, causing an update to be applied to the queue to indicate that said each task has been processed, wherein the update is replicated to the plurality of data centers.

13. The method of claim 11, further comprising:
  initiating the particular call to the entity routing service, wherein the particular call includes the particular entity identifier;
  determining, by the entity routing service, that the particular entity identifier is associated with the third data center;
  receiving, from the entity routing service, a particular response that indicates that the particular entity identifier is associated with a data center that is different than the first data center;
  determining, based on the particular response, not to process the particular task.

14. The method of claim 13, further comprising:
  in response to determining not to process the particular task, causing an update to be applied to the queue, in the first data center, from which the plurality of tasks are retrieved;
  wherein the update indicates that the particular task is associated with the second data center;
  wherein updates to the queue are automatically replicated to other data centers in the plurality of data centers.

15. The method of claim 11, wherein the particular data center is the first data center, wherein processing said each task comprises:
  based on the entity identifier of said each task, identifying a particular row in a table that is replicated across the plurality of data centers;
  applying one or more changes to the particular row based on said task;
  wherein, after the one or more changes are applied to the particular row, the one or more changes are replicated to each other data center, of the plurality of data centers, that is different than the first data center.

\* \* \* \* \*